US012659584B2

(12) United States Patent
Choi et al.

(10) Patent No.: US 12,659,584 B2
(45) Date of Patent: Jun. 16, 2026

(54) METHOD AND APPARATUS WITH AUTOFOCUS

(71) Applicant: SAMSUNG ELECTRONICS CO., LTD., Suwon-si (KR)

(72) Inventors: Myungsub Choi, Suwon-si (KR); Hana Lee, Suwon-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 18/341,970

(22) Filed: Jun. 27, 2023

(65) Prior Publication Data

US 2024/0147065 A1      May 2, 2024

(30) Foreign Application Priority Data

Oct. 31, 2022   (KR) ........................ 10-2022-0142661
Jan. 9, 2023   (KR) ........................ 10-2023-0002774

(51) Int. Cl.
   *H04N 23/67*      (2023.01)
   *H04N 19/117*      (2014.01)
   *H04N 19/167*      (2014.01)
(52) U.S. Cl.
   CPC ......... *H04N 23/675* (2023.01); *H04N 19/117* (2014.11); *H04N 19/167* (2014.11); *H04N 23/672* (2023.01)
(58) Field of Classification Search
   CPC .. H04N 23/675; H04N 19/117; H04N 19/167; H04N 23/672
   See application file for complete search history.

(56) References Cited

U.S. PATENT DOCUMENTS

| | | | | |
|---|---|---|---|---|
| 4,487,502 A | * | 12/1984 | Fantozzi | ............ G01M 11/0228 356/125 |
| 2008/0317452 A1 | * | 12/2008 | Kim | ........................ G02B 7/08 396/104 |
| 2018/0121718 A1 | * | 5/2018 | Ekpenyong | ........... G06T 3/4053 |
| 2021/0051262 A1 | * | 2/2021 | Wang | ................... H04N 23/675 |
| 2021/0067705 A1 | * | 3/2021 | Galor Gluskin | .......... G06T 7/80 |
| 2023/0114785 A1 | * | 4/2023 | Stepanova | ........... H04N 13/128 348/47 |

(Continued)

FOREIGN PATENT DOCUMENTS

| | | |
|---|---|---|
| CN | 113747041 A | 12/2021 |
| JP | 2020-60602 A | 4/2020 |

(Continued)

OTHER PUBLICATIONS

Ho, Chi-Jui, et al., "AF-Net: A Convolutional Neural Network Approach to Phase Detection Autofocus." IEEE Transactions on Image Processing 29 (2020): 6386-6395.
Herrmann, Charles, et al. "Learning to Autofocus." Proceedings of the IEEE/CVF Conference on Computer Vision and Pattern Recognition. 2020, (10 pages).
Choi, Myungsub, et al., "Exploring Positional Characteristics of Dual-Pixel Data for Camera Autofocus." Proceedings of the IEEE/CVF International Conference on Computer Vision. 2023, (11 pages).

(Continued)

*Primary Examiner* — Shahbaz Nazrul
(74) *Attorney, Agent, or Firm* — NSIP Law

(57) ABSTRACT

A processor-implemented method includes: generating first input data comprising phase information of an input image; generating second input data in which lens position information is encoded; and determining position information of a lens corresponding to autofocus by inputting the first input data and the second input data to a neural network model.

34 Claims, 9 Drawing Sheets

(56)  References Cited

U.S. PATENT DOCUMENTS

| | | | | |
|---|---|---|---|---|
| 2023/0314909 A1* | 10/2023 | DiMeo | .................... | G03B 13/36 |
| | | | | 348/345 |
| 2023/0319401 A1* | 10/2023 | Feng | ......................... | G06T 7/50 |
| | | | | 348/241 |
| 2023/0333452 A1* | 10/2023 | Schröer | ................ | G02B 3/0075 |
| 2023/0379579 A1* | 11/2023 | Feng | .................... | H04N 23/672 |
| 2024/0290080 A1* | 8/2024 | Ito | ............................. | G06N 3/08 |
| 2025/0080839 A1* | 3/2025 | Galor Gluskin | ....... | H04N 23/71 |
| 2025/0097575 A1* | 3/2025 | Feng | .................... | H04N 23/672 |

FOREIGN PATENT DOCUMENTS

| | | |
|---|---|---|
| KR | 10-2012-0133161 A | 12/2012 |
| KR | 10-2017-0067634 A | 6/2017 |
| KR | 10-2339662 B1 | 12/2021 |

OTHER PUBLICATIONS

Extended European search report issued on Mar. 19, 2024, in counterpart European Patent Application No. 23201044.7 (13 pages).

Seok, Godeun et al., "Single-Pixel Autofocus with Plasmonic Nanostructures," Current Optics and Photonics, vol. 4, No. 5, Oct. 2020, (p. 428-433).

Herrmann, Charles, et al., "Learning to Autofocus," Proceedings of the IEEE/CVF Conference on Computer Vision and Pattern Recognition, 2020, (p. 2230-2239).

Xin, Shumian, et al., "Defocus Map Estimation and Deblurring from a Single Dual-Pixel Image," Proceedings of the IEEE/CVF International Conference on Computer Vision, 2021, (p. 2228-2238).

Wang, Chengyu, et al., "Deep Learning for Camera Autofocus," IEEE Transactions on Computational Imaging, vol. 7, Mar. 12, 2021, (p. 258-271).

* cited by examiner

First input data                    Second input data

METHOD AND APPARATUS WITH AUTOFOCUS

CROSS-REFERENCE TO RELATED APPLICATIONS

This application claims the benefit under 35 USC § 119(a) of Korean Patent Application No. 10-2022-0142661 filed on Oct. 31, 2022, and Korean Patent Application No. 10-2023-0002774 filed on Jan. 9, 2023, in the Korean Intellectual Property Office, the entire disclosures of which are incorporated herein by reference for all purposes.

BACKGROUND

1. Field

The following description relates to a method and apparatus with autofocus.

2. Description of Related Art

An autofocus (AF) function may adjust a focus at the time of capturing an image.

Methods for operating the AF function may including, for example, a contrast detection autofocus (CDAF) method and a phase detection autofocus (PDAF) method. The CDAF method may be a method of obtaining image frames while moving a lens and finding a position of the lens that allows the definition of the obtained image frames to be the highest. The PDAF method may be a method of separating light incident on a camera and finding a position of a lens based on two image frames obtained by the separating.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method includes: generating first input data comprising phase information of an input image; generating second input data in which lens position information is encoded; and determining position information of a lens corresponding to autofocus by inputting the first input data and the second input data to a neural network model.

The method may include generating third input data in which position information corresponding to a region of interest (ROI) of the input image is encoded.

The generating of the third input data further may include encoding a relative position of the ROI in the first input data into first-axis data and second-axis data.

The generating of the third input data further may include encoding the position information of the ROI based on intensity information of light entering an image sensor through the lens.

The generating of the third input data further may include encoding the position information of the ROI based on a Gaussian filter.

The determining of the position information of the lens may include determining the position information of the lens by inputting the third input data to the neural network model along with the first input data and the second input data.

The generating of the second input data further may include encoding the lens position information such that a position of the lens is represented as a consecutive numerical value.

The generating of the second input data further may include encoding the lens position information based on a nonlinear function value adjusted to a focal length according to a position of the lens.

The generating of the second input data further may include encoding the lens position information in the form of a single channel.

The generating of the second input data further may include encoding the lens position information in the form of a scaling factor.

The determining of the position information of the lens may include predicting one position corresponding to the autofocus among a plurality of preset candidate positions.

The determining of the position information of the lens may include determining one scalar value corresponding to the autofocus.

The first input data may include a dual-pixel image.

In one or more general aspects, a non-transitory computer-readable storage medium stores instructions that, when executed by a processor, configure the processor to perform any one, any combination, or all of operations and/or methods described herein.

In one or more general aspects, an electronic device includes: one or more processors configured to: generate first input data comprising phase information of an input image; generate second input data in which lens position information is encoded; and determine position information of a lens corresponding to autofocus by inputting the first input data and the second input data to a neural network model.

The one or more processors may be configured to generate third input data in which position information corresponding to a region of interest (ROI) of the input image is encoded.

For the generating of the third input data, the one or more processors may be configured to encode a relative position of the ROI in the first input data into first-axis data and second-axis data.

For the determining of the position information of the lens, the one or more processors may be configured to generate the position information of the lens by inputting the third input data to the artificial neural network model along with the first input data and the second input data.

For the generating of the second input data, the one or more processors may be configured to encode the lens position information such that a position of the lens is represented as a consecutive numerical value.

For the generating of the second input data, the one or more processors may be configured to encode the lens position information based on a nonlinear function value adjusted to a focal length according to a position of the lens.

For the determining of the position information of the lens, the one or more processors may be configured to predict one position corresponding to the autofocus among a plurality of preset candidate positions.

For the determining of the position information of the lens, the one or more processors may be configured to generate one scalar value corresponding to the autofocus.

The first input data may include a dual-pixel image.

In one or more general aspects an electronic device includes: a movable lens; an image sensor configured to generate phase information of an image signal corresponding to an optical image formed by a current position of the lens; and one or more processors configured to: encode position information of a region of interest (ROI) in the image signal; and perform autofocus based on the phase information and the encoded position information of the ROI.

The one or more processors may be configured to encode the position information of the ROI based on intensity information of light entering the image sensor through the lens.

For the encoding of the position information of the ROI, the one or more processors may be configured to encode the position information of the ROI based on a Gaussian filter.

In one or more general aspects, a method includes: obtaining a first image formed on the first pixels through a current position of the lens and a second image formed on the second pixels through the current position of the lens; obtaining a region of interest (ROI) corresponding to a portion of the first image and the second image; inputting a first image corresponding to the ROI, a second image corresponding to the ROI, the current position of the lens, and a position of the ROI to a neural network model; receiving, as an output, a position of the lens in focus from the neural network model; and moving the lens to the position in focus.

All pixels of the image sensor may be included in the pairs of the first pixels and the second pixels.

Only some pixels of the image sensor may be included in the pairs of the first pixels and the second pixels.

The ROI may be a region inputted from a user.

The ROI may be a region corresponding to a specific object.

The specific object may be a human face.

The ROI may be a preset region in the first image and the second image.

The ROI may be a central region in the first image and the second image.

X-axis data and y-axis data of the may be individually input to the neural network model.

The current position of the lens may be input to the neural network model as a single channel.

The current position of the lens may be applied to the neural network model as a scalar value.

The position of the lens in focus may be output as one of 100 or more consecutive positions within a movable range of the lens.

The position of the lens in focus may be output as one of 1000 or more consecutive positions within a movable range of the lens.

Other features and aspects will be apparent from the following detailed description, the drawings, and the claims.

Figure 1A:
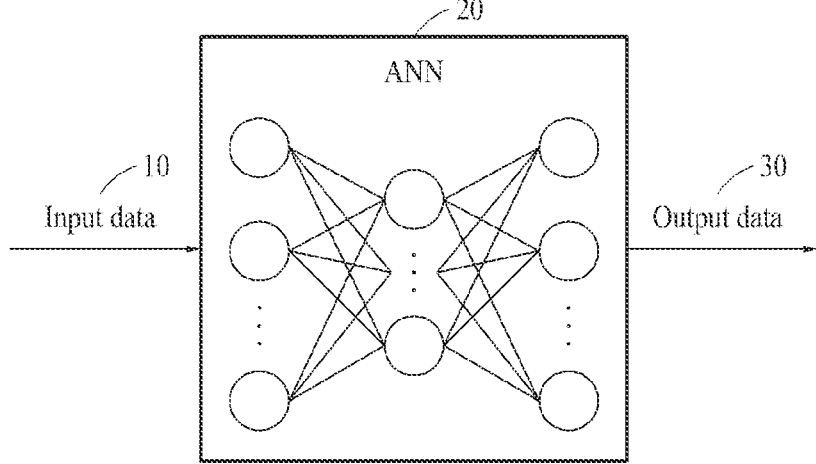
FIG. 1A illustrates an example deep learning operation method using an artificial neural network (ANN), in accordance with one or more example embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between"

and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The example embodiments described herein may be various types of products, such as, for example, a personal computer (PC), a laptop computer, a tablet computer, a smartphone, a television (TV), a smart home appliance, an intelligent vehicle, a kiosk, and/or a wearable device, as non-limiting examples. Hereinafter, examples will be described in detail with reference to the accompanying drawings. When describing the examples with reference to the accompanying drawings, like reference numerals refer to like components and a repeated description related thereto is omitted.

Autofocus may be a function of automatically focusing on a specific object and may also be referred to as automatic focusing or AF. A method and an apparatus of one or more embodiments may quickly and accurately perform focusing, thereby increasing user convenience when capturing images or videos.

There may be methods to implement such an autofocus function such as a contrast detection autofocus (CDAF) method and/or a phase detection autofocus (PDAF) method.

The CDAF method may be a method of obtaining image frames while moving a lens and finding a position of the lens that allows the definition of the obtained image frames to be the highest. The PDAF method may be a method of separating light incident on a camera and finding a position of a lens based on two image frames obtained by the separating.

The CDAF method may use a relatively great amount of time to reach a final position because it calculates a contrast metric while continuously moving a lens. Also, the CDAF method may obtain an inaccurate contrast metric and may not identify whether a peak is reached until the lens is moved directly.

Although the PDAF method may be faster than the CDAF method, the PDAF method may have a lower performance overall compared to the CDAF method because the PDAF method finds a position of a lens in focus at once. Also, the PDAF method may need to map in advance a position of a lens according to a phase difference through calibration, and there may be a phase error in low light conditions under which there are significant device process errors and noise.

As will be described in detail below, an autofocus (or AF) method according to one or more example embodiments may perform autofocus using deep learning. The autofocus method of one or more embodiments may improve autofocus performance by adding positional encoding as an input of an artificial neural network (ANN), based on characteristics of a phase difference that vary depending on a position of each pixel in an image. Hereinafter, an example of the ANN will be described with reference to FIGS. 1A and 1B before a detailed description of the autofocus method according to one or more example embodiments.

FIG. 1A illustrates an example deep learning operation method using an ANN, in accordance with one or more example embodiments.

An artificial intelligence (AI) method including deep learning or the like may input, to an ANN, input data and learn output data through an operation such as a convolution. The ANN may refer to a computational architecture. In the ANN, nodes may be connected to each other and collectively operate to process the input data. The ANN may be or include, as non-limiting examples, a feed-forward neural network, a deep neural network (DNN), a convolutional neural network (CNN), a recurrent neural network (RNN), a deep belief network (DBN), and/or a restricted Boltzmann machine (RBM). In the feed-forward neural network, nodes may have links to other nodes, and such links may extend through the neural network in one direction (for example, in a forward direction).

Referring to FIG. 1A, input data 10 may be input to an ANN (e.g., a CNN 20) including one or more layers, and output data 30 may be output through the ANN. The ANN may be, for example, a DNN including two or more layers.

The CNN 20 may be used to extract "features" such as, for example, a border, a line, and a color, from the input data 10. The CNN 20 may include a plurality of layers, each of which may receive data, process the received data, and generate data to be output therefrom. The data output from a layer may be a feature map generated by performing a convolution operation between an image (or a feature map that is input to the CNN 20) and a weight value of a filter. Initial layers of the CNN 20 may operate to extract low-level features such as edges or gradients from an input. Subsequent layers of the CNN 20 may operate to extract gradually more complex features such as eyes and nose in an image.

Figure 1B:
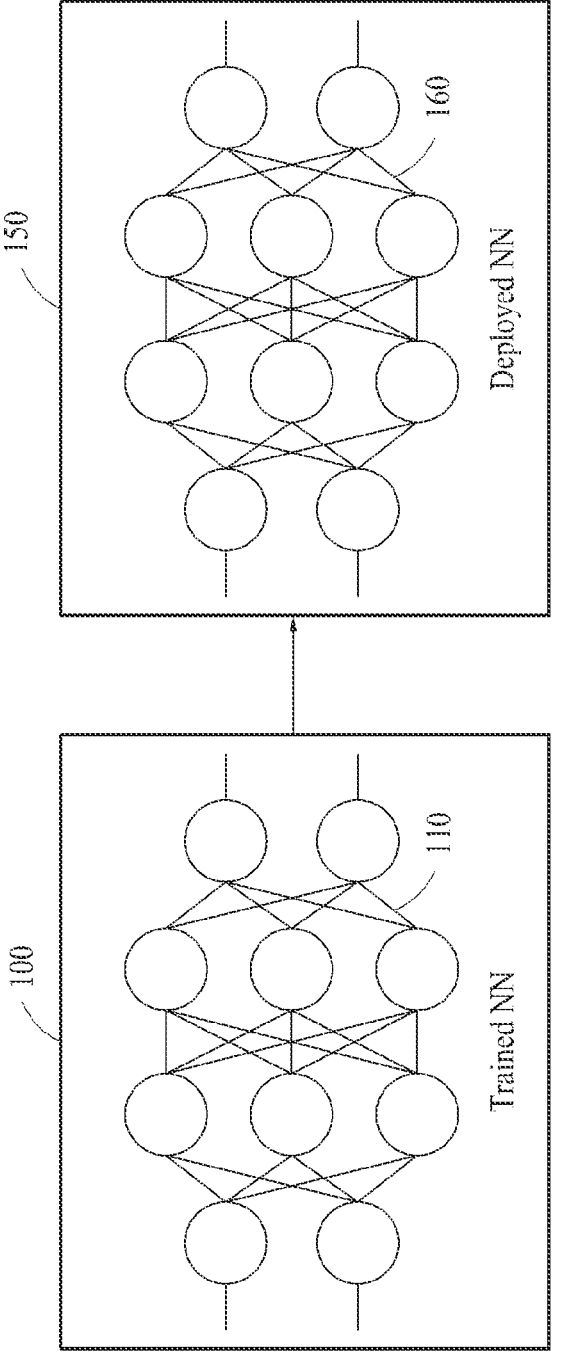
FIG. 1B illustrates an example training and inference method of an ANN, in accordance with one or more example embodiments.

FIG. 1B illustrates an example training and inference method of an ANN, in accordance with one or more example embodiments.

Referring to FIG. 1B, an autofocus system according to an embodiment may include a training device 100 and an inference device 150. The training device 100 may correspond to a computing device having various processing functions, for example, functions of generating a neural network, training (or learning) the neural network, and retraining the neural network. The training device 100 may be implemented as various types of devices, for example, a personal computer (PC), a server device, or a mobile device.

The training device 100 may generate a trained neural network 110 by repeatedly training or learning a given initial neural network. Generating the trained neural network 110 may include determining neural network parameters. The parameters may include various types of data that are input to and output from the neural network (for example, input/output activations, weights, and/or biases). As the neural network is repeatedly trained, the neural network parameters may be adjusted (or tuned) to generate a more accurate output in response to a given input.

The training device 100 may transmit the trained neural network 110 to the inference device 150. The inference device 150 may be, or be included in, for example, a mobile device and/or an embedded device. The inference device 150, which is dedicated hardware for driving the neural network, may be an electronic device including at least one of a processor, a memory, an input/output interface (or an I/O interface), a display, a communication interface, and/or a sensor.

The inference device 150 may be or include any type of digital devices that have a computational capability with a memory means and a microprocessor equipped therewith, such as, for example, a tablet PC, a smartphone, a PC (e.g., a laptop, etc.), an AI speaker, a smart TV, a mobile phone, a navigation device, a web pad, a personal digital assistant (PDA), a workstation, and/or the like.

The inference device 150 may operate the trained neural network 110 without a change or operate a neural network 160 obtained (e.g., generated) by processing (e.g., quantizing) the trained neural network 110. The inference device 150 that operates the processed neural network 160 may be implemented in a separate device independent of the training device 100. However, examples are not limited thereto, and the inference device 150 may also be implemented in the same device as the training device 100. For example, the inference device 150 may include the training device 100, or the training device 100 may include the inference device 150.

Figure 2A:
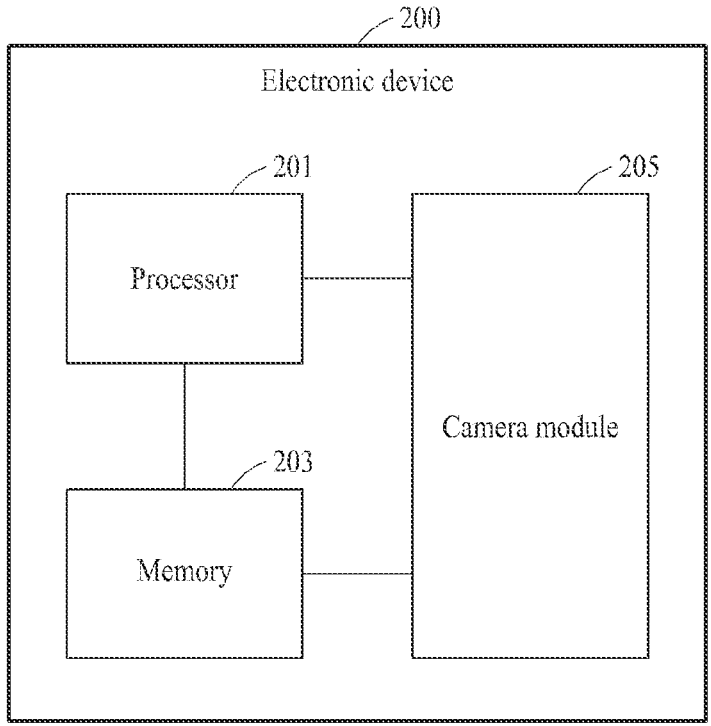
FIG. 2A illustrates an example electronic device, in accordance with one or more example embodiments.

FIG. 2A illustrates an example electronic device, in accordance with one or more example embodiments.

The description provided above with reference to FIGS. 1A and 1B may also apply to an example of FIG. 2A. For example, the description of the inference device 150 of FIG. 1B may also apply to an electronic device 200 of FIG. 2A. For example, the electronic device 200 may include either one or both of the training device 100 and the inference device 150 of FIG. 1B. The electronic device 200, which is a device with autofocus (e.g., a device performing an autofocus operation), may be a digital device including an audio output function, a wired/wireless communication function, and/or other functions.

Referring to FIG. 2A, the electronic device 200 may include a processor 201 (e.g., one or more processors), a memory 203 (e.g., one or more memories), and a camera module 205.

The memory 203 may store computer-readable instructions. When the instructions stored in the memory 203 are executed by the processor 201, the processor 201 may process operations defined by the instructions. The memory 203 may include, for example, random-access memory (RAM), dynamic RAM (DRAM), static RAM (SRAM), or other types of non-volatile memory known in the art. The memory 203 may store a pretrained ANN model. For example, the memory 203 may be or include a non-transitory computer-readable storage medium storing instructions that, when executed by the processor 201, configure the processor 201 to perform any one, any combination, or all of the operations and methods described herein with reference to FIGS. 1-6.

The processor 201 may control the overall operation of the electronic device 200. The processor 201 may be a hardware device having a physically-structured circuit configured to execute desired operations. The desired operations may include code or instructions included in a program. The hardware device may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), a neural processing unit (NPU), and/or the like.

The camera module 205 may capture a still image and a moving image. The camera module 205 may include one or more lenses, image sensors, image signal processors (ISPs), and/or flashes. A non-limiting example of a detailed configuration of the camera module 205 will be described below with reference to FIG. 2B.

Figure 2B:
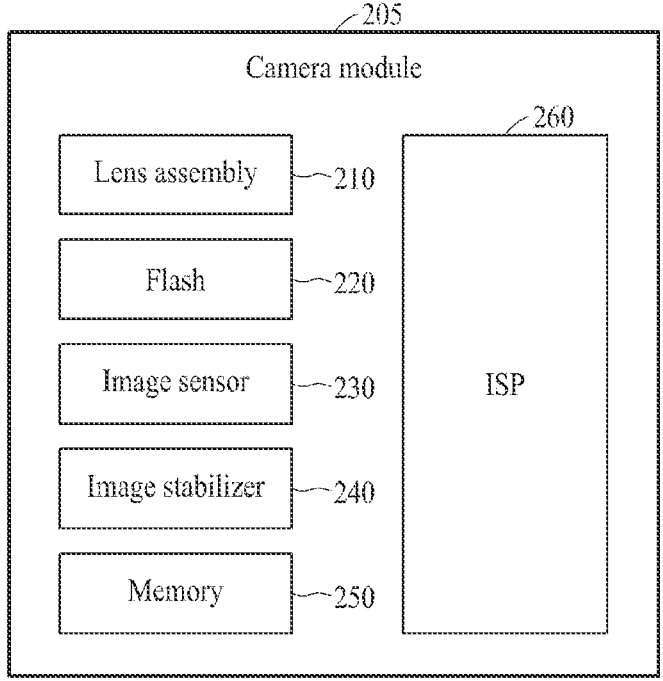
FIG. 2B illustrates an example camera module, in accordance with one or more example embodiments.

FIG. 2B illustrates an example camera module, in accordance with one or more example embodiments.

Referring to FIG. 2B, the camera module 205 may include a lens assembly 210, a flash 220, an image sensor 230, an image stabilizer 240, a memory 250 (e.g., one or more buffer memories), and an ISP 260 (e.g., one or more ISPs). The lens assembly 210 may collect light emitted from an object which is a target from which an image is to be captured. The lens assembly 210 may include one or more lenses. In an example, the camera module 205 may include a plurality of lens assemblies 210 (e.g., the lens assembly 210 may be a plurality of lens assemblies). In this example, the camera module 205 may include and implement, for example, a dual camera, a 360-degree camera, and/or a spherical camera. A portion of the lens assemblies 210 may have the same lens properties (e.g., an angle of view, a focal length, an autofocus, an f number, and/or an optical zoom), or at least one of the lens assemblies 210 may have lens properties that are different from other lens assemblies. The lens assembly 210 may include, for example, a wide-angle lens and/or a telephoto lens.

The flash 220 may emit light to be used to enhance light emitted or reflected from the object. In an example, the flash 220 may include light-emitting diodes (LEDs) (e.g., a red-green-blue (RGB) LED, a white LED, an infrared (IR) LED, and/or an ultraviolet (UV) LED), and/or a xenon lamp. The image sensor 230 may obtain an image corresponding to the object by converting, into an electrical signal, the light emitted or reflected from the object and transmitted via the lens assembly 210. In an example, the image sensor 230 may include, for example, one image sensor selected from among image sensors having different properties (such as, for example, an RGB sensor, a black and white (BW) sensor, an IR sensor, or a UV sensor), a plurality of image sensors having the same properties, or a plurality of image sensors having different properties. Additionally or alternatively, the image sensor 230 may obtain phase information (e.g., a phase difference) of an image. The image sensor 230 may include, for example, an image sensor configured to obtain phase information, such as, for example, a dual-pixel sensor and/or a quad-pixel sensor. Each image sensor included in the image sensor 230 may be implemented using, for example, a charge-coupled device (CCD) sensor and/or a complementary metal-oxide-semiconductor (CMOS) sensor.

The image stabilizer 240 may move at least one lens included in the lens assembly 210 or the image sensor 230 in a specific direction and/or control an operation characteristic (e.g., adjust a read-out timing) of the image sensor 230, in response to a movement of the camera module 205 and/or the electronic device 200 including the camera module 205. The moving of the at least one lens and/or the controlling of the operation characteristic may compensate for at least a portion of a negative effect of the movement of the camera module 205 and/or the electronic device 200 on an image to be captured. In an example, the image stabilizer 240 may sense such a movement of the camera module 205 or the electronic device 200 using a gyro sensor and/or an acceleration sensor disposed inside or outside the camera module 205 (e.g., included in the electronic device 200). In an example, the image stabilizer 240 may be or include, for example, an optical image stabilizer.

The memory 250 may temporarily store at least a portion of an image obtained through the image sensor 230 for a subsequent image processing operation. For example, when image acquisition is delayed by a shutter or a plurality of images is obtained relatively fast, an obtained original image (e.g., a Bayer-patterned image or a high-resolution image) may be stored in the memory 250 and a copy image (e.g., a low-resolution image) corresponding the original image may be previewed through a display module. Subsequently, when a specified condition (e.g., a user input or a system command) is satisfied, at least a portion of the original image stored in the memory 250 may be obtained and processed by, for example, the ISP 260. In an example, the memory 250 may be configured as at least a part of the memory 203 or as a separate memory operated independently of the memory 203.

The ISP 260 may perform one or more image processing operations on an image obtained through the image sensor 230 and/or an image stored in the memory 250. The image processing operations may include, for example, depth map generation, autofocus, three-dimensional (3D) modeling, panorama generation, feature point extraction, image synthesis, and/or image compensation (e.g., noise reduction, resolution adjustment, brightness adjustment, blurring, sharpening, and/or softening). Additionally or alternatively, the ISP 260 may control at least one of the components (e.g., the image sensor 230) included in the camera module 205. For example, the ISP 260 may control an exposure time, a read-out timing, and/or the like.

An image obtained by the processing of the ISP 260 may be stored again in the memory 250 for further processing and/or be provided to an external component (e.g., the memory 203, the processor 201, and/or a display module) of the camera module 205. In an example, the ISP 260 may be configured as at least a part of the processor 201 or as a separate processor operated independently of the processor 201. For example, when the ISP 260 is configured as a processor separate from the processor 201, at least one image processed by the ISP 260 may be displayed as it is without a change by the processor 201 or be displayed through the display module after additional image processing by the processor 201.

In an example, the electronic device 200 may include a plurality of camera modules 205 (e.g., the camera module 205 may be a plurality of camera modules) having different properties or functions. In this example, at least one of the camera modules 205 may be a wide-angle camera, and at least another one of the camera modules 205 may be a telephoto camera. Similarly, at least one of the camera modules 205 may be a front camera, and at least another one of the camera modules 205 may be a rear camera.

Figure 3:
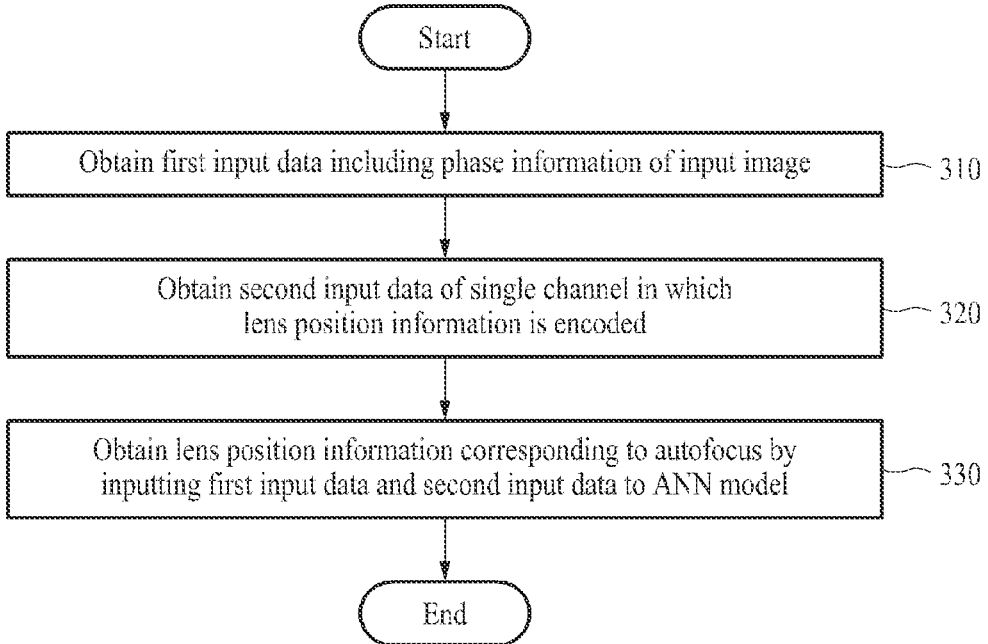
FIG. 3 illustrates an example method with autofocus, in accordance with one or more example embodiments.

FIG. 3 illustrates an example method with autofocus (e.g., an autofocus performing method), in accordance with one or more example embodiments.

For the convenience of description, operations 310 to 330 will be described as being performed using the electronic device 200 illustrated in FIGS. 2A and 2B. However, operations 310 to 330 may also be performed by another suitable electronic device in a suitable system.

The operations of FIG. 3 may be performed in the illustrated order and manner. However, the order of some of the operations may be changed, or some of the operations may be omitted, without departing from the spirit and scope of the illustrated example. The operations of FIG. 3 may be performed in parallel or simultaneously.

In operation 310, the electronic device 200 may obtain (e.g., generate or determine) first input data including phase information of an input image. The first input data may be raw data obtained from an image sensor (e.g., the image sensor 230 of FIG. 2B), and may include any or all types of data from which a phase difference may be calculated. The first input data may include, for example, a dual-pixel image and/or a quad-pixel image. For example, a dual-pixel sensor may divide light emitted or reflected from an object and transmitted through a lens assembly (e.g., the lens assembly 210 of FIG. 2B) into two branches and convert it into an electrical signal, and calculate (e.g., determine) a phase difference between the two signals, and may therefore obtain a phase difference corresponding to an input image. However, a method of obtaining the first input data is not limited to the foregoing example, and various methods of obtaining the phase information may be applied. For example, the various methods may include: a dual-pixel pro method that adds an inclined angular structure to a green pixel among RGB pixels to which dual pixels are applied and measures an upper and lower phase difference, in addition to a left and right phase difference; a super phase detection (PD) method that uses an entire area of pixels for recognizing a phase difference to meet a focus; a quad phase detection (QPD) method that measures a phase difference using all pixels; and/or the like.

In operation 320, the electronic device 200 may obtain second input data in which lens position information is encoded. The electronic device 200 may encode a current position of a lens. Encoding the lens position information may be construed as representing a position of a camera lens as a consecutive numerical value. The electronic device 200 may model consecutive positions of the lens within an entire movable range of the lens included in the lens assembly 210. A non-limiting example of a method of encoding a current position of a lens will be described in detail below with reference to FIGS. 4A and 4B.

In operation 330, the electronic device 200 may obtain position information of the lens corresponding to an autofocus by inputting the first input data and the second input data to an ANN model. The ANN model may also be referred to as an autofocus determination model. The ANN model may include a CNN but is not limited thereto. The ANN model may include, for example, a MobileNet-v2 model (which is a CNN considering a mobile environment), VGGNet, ResNet, MCU Net, and/or the like.

The ANN model may be trained by the training device 100 to receive the first input data and the second input data and output the position information of the lens corresponding to the autofocus. For example, the training device 100 may determine, as an error, a difference between a position of a lens obtained by inputting, to the ANN model, first input data (e.g., a dual-pixel image) for learning and second input data in which a current position of the lens is encoded and a ground truth position of the lens corresponding to the first input data for learning, and may update weights and/or biases of the ANN used for an operation or calculation by backpropagating the error into the ANN.

The training device 100 may, though the training of the ANN, configure the ANN model as a classification model that predicts a class corresponding to one of preset N positions and/or as a regression model that directly predicts a movable range of the lens according to a definition of an output value of the ANN model. For example, when the training device 100 trains the ANN model with the classification model, the ANN model may output a class corresponding to a position of a lens. For example, when the training device 100 trains the ANN model with the regression model, the ANN model may output one scalar value corresponding to a position of a lens.

Figure 4A:
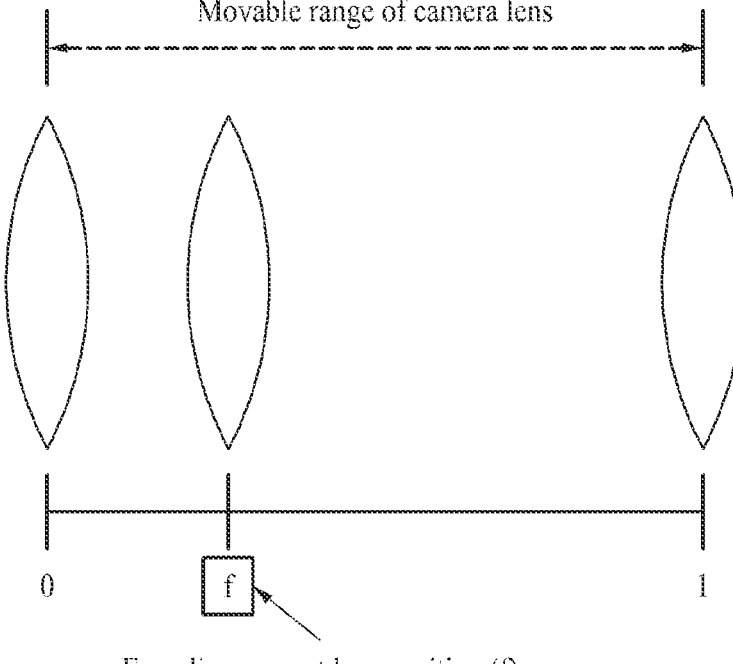
FIGS. 4A and 4B illustrate an example of encoding a position of a lens, in accordance with one or more example embodiments.
Figure 4B:
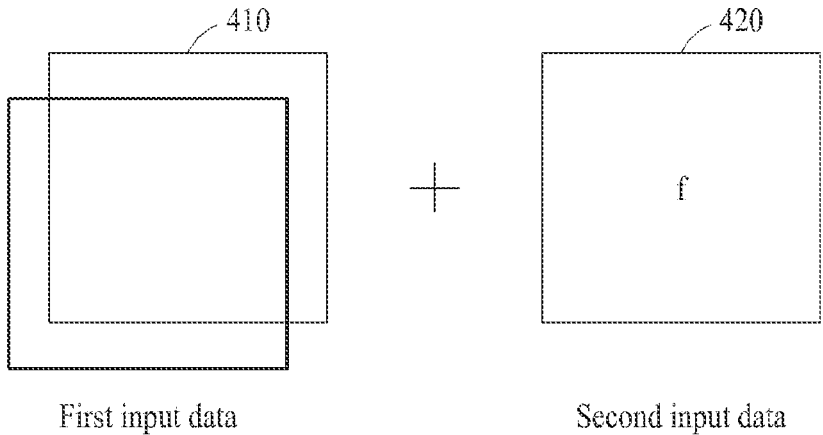

FIGS. 4A and 4B illustrate an example of encoding a position of a lens, in accordance with one or more example embodiments.

The description provided above with reference to FIGS. 1A through 3 may also apply to the example of FIGS. 4A and 4B. The electronic device 200 according to an embodiment may encode a current lens position and represent a position of a camera lens as a consecutive numerical value. For example, referring to FIG. 4A, the electronic device 200 may normalize an entire movable range of the camera lens to a preset range (e.g., a random value between 0 and 1) and linearly represent a current position (e.g., "f") of the lens. Alternatively, the electronic device 200 may encode the current position of the lens based on a nonlinear function, in consideration of a change in focal length relative to a position of the lens.

To determine a position of a lens corresponding to an autofocus through an ANN model, current position information of the lens may be input along with phase information. In this case, there may be various methods to represent the input position information. For example, there may be a method of representing the input position information which includes setting a number (e.g., 49) of positions of the lens and activating only a corresponding position among the positions (e.g., 49) at an input end of the ANN model to represent lens position information.

However, according to this typical method of representing the input position information, there may be a problem in that the size of input data is extremely large and only discrete lens positions may be covered. For example, when a central patch of the size of 128*128 in a dual-pixel image is received as an input, input data may be configured to have 98 channels, which is 49 times that of a 2-channel patch, and thus 98*128*128(*16 bit)>3 MB or more data may need to be processed each time a lens position is estimated.

In contrast, referring to FIG. 4B, the electronic device 200 of one or more embodiments may encode position information of a lens and represent the position information of the lens as a single channel 420. Therefore, the electronic device 200 of one or more embodiments may, to advantageously reduce an amount of processing, reduce the size of total input data by adding only the single channel 420 corresponding to positional encoding of the lens to an input of the ANN model, in addition to first input data 410. For example, when a central patch of the size of 128*128 in a dual-pixel image is received as an input, the electronic device 200 of one or more embodiments may reduce the size of the total input data to (2+1)*128*128(*16 bit), which is 0.1 MB or less.

Although FIG. 4B illustrates an example of encoding the position information of the lens as the single channel 420, a method of encoding position information of a lens is not limited to the foregoing example. For example, the electronic device 200 may also encode position information of a lens as an n-channel (where, n is a natural number greater than or equal to 2). The electronic device 200 may also encode position information of a lens in the form of a scaling factor.

A focal length corresponding to each position of a lens may differ for each type of camera, and thus an error may occur unless a position is newly set according to the type of camera and/or electronic device when setting in advance a position of the lens.

Also, by encoding position information of a lens as described, the electronic device 200 of one or more embodiments apply the position information to more diverse types of cameras only with one ANN model through a simple conversion of a positional encoding function, even when a camera is changed.

Figure 5:
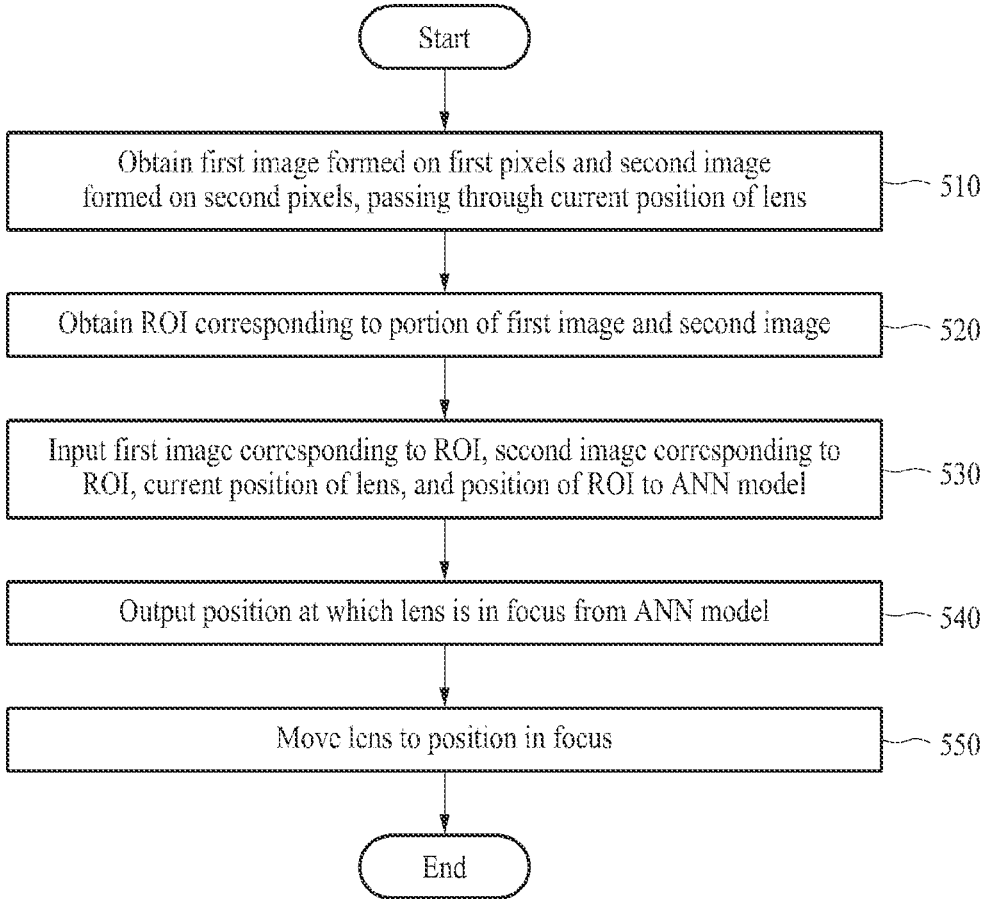
FIG. 5 illustrates an example method with autofocus, in accordance with one or more example embodiments.

FIG. 5 illustrates an example method with autofocus (e.g., an autofocus performing method), in accordance with one or more example embodiments.

For the convenience of description, operations 510 to 550 will be described as being performed using the electronic device 200 illustrated in FIGS. 2A and 2B. However, operations 510 to 550 may also be performed by another suitable electronic device in a suitable system.

The operations of FIG. 5 may be performed in the illustrated order and manner. However, the order of some of the operations may be changed, or some of the operations may be omitted, without departing from the spirit and scope of the illustrated example. The operations of FIG. 5 may be performed in parallel or simultaneously.

The electronic device 200 may include an image sensor including pairs of first pixels and second pixels spaced apart from each other and a movable lens spaced apart from the image sensor. All pixels of the image sensor may be included in the pairs of the first pixels and the second pixels. Alternatively, only some of the pixels of the image sensor may be included in the pairs of the first pixels and the second pixels.

In operation 510, the electronic device 200 may obtain a first image formed on the first pixels and a second image formed on the second pixels, through a current position of the lens.

In operation 520, the electronic device 200 may obtain a region of interest (ROI) corresponding to a portion of the first image and the second image. The ROI may be obtained by various methods. For example, the ROI may include a region (e.g., a face region) corresponding to an object (e.g., a face) included in an input image, the region being received as an input from a user (e.g., a region input by the user touching a display module), or a preset region (e.g., a central region) in the first image and the second image.

In operation 530, the electronic device 200 may input a first image corresponding to the ROI, a second image corresponding to the ROI, the current position of the lens, and a position of the ROI to an ANN model. The first image corresponding to the ROI and the second image corresponding to the ROI may include the first input data described above with reference to FIGS. 2A through 4B, and the current position of the lens may include the second input data described above with reference to FIGS. 2A through 4B.

In operation 540, the electronic device 200 may receive, as an output, a position of the lens in focus from the ANN model. The position of the lens in focus may be output as one of preset n or more consecutive positions (where, n is a natural number greater than or equal to 2 and may be, for example, 100 or 1000) within a movable range of the lens.

In operation 550, the electronic device 200 may move the lens to the position in focus.

Figure 6:
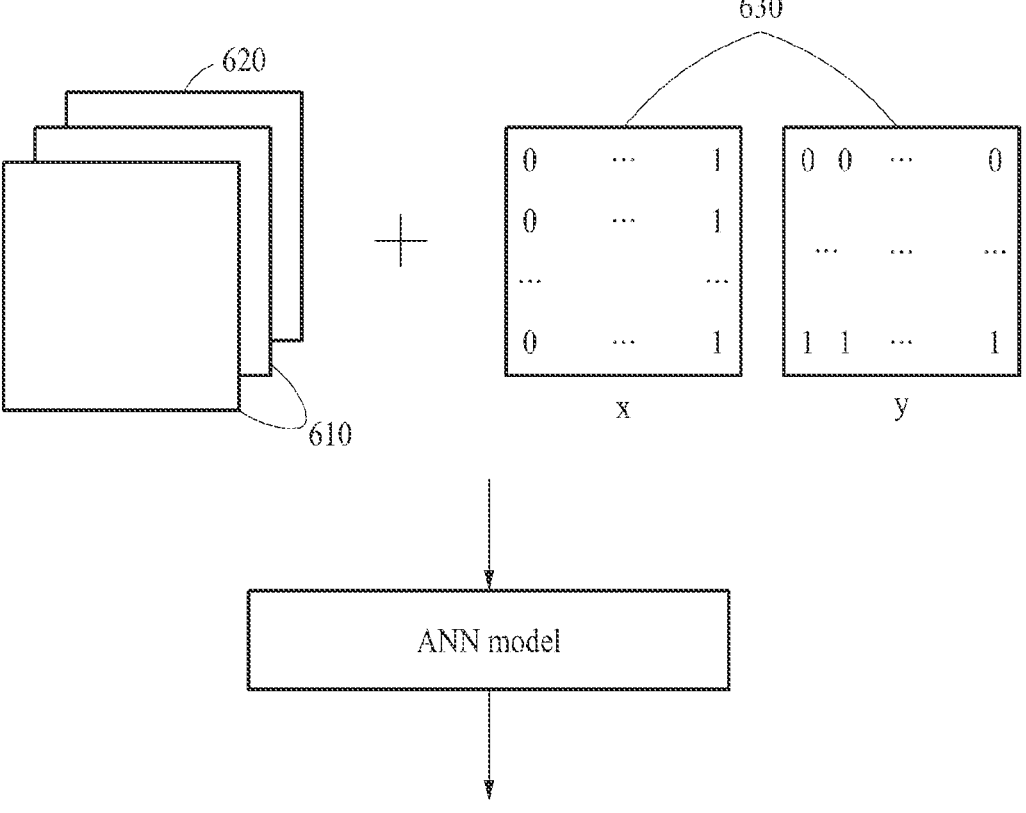
FIG. 6 illustrates an example of encoding position information corresponding to a region of interest (ROI), in accordance with one or more example embodiments.

FIG. 6 illustrates an example of encoding position information corresponding to an ROI, in accordance with one or more example embodiments.

The description provided above with reference to FIGS. 1A through 5 may also apply to the example of FIG. 6.

A phase difference may not occur in the same pattern at all positions in an input image. Therefore, a typical phase difference detection autofocus method may have its limitation even though it sets in advance a focal length for a phase difference from a sensor output through calibration separately for each position of an ROI in an input image.

Referring to FIG. 6, the training device 100 according to an embodiment may include and add positional encoding corresponding to an ROI in an input image into input data of an ANN model, thereby allowing the ANN model to automatically learn characteristics corresponding to a relative position in the input image. That is, the training device 100 may train the ANN model using first input data and third input data.

The electronic device 200 may obtain the third input data in which position information corresponding to the ROI of the input image is encoded.

The electronic device 200 may encode the position information corresponding to the ROI. Encoding the position information corresponding to the ROI may be construed as representing the ROI in the input image as numerical values. For example, when the input image is a two-dimensional (2D) image, the electronic device 200 may linearly represent horizontal and vertical directions as a preset range (e.g., a random value between 0 and 1). Alternatively, the electronic device 200 may encode the position information corresponding to the ROI by a nonlinear representation based on characteristics of an actual lens and sensor. However, a method of obtaining the third input data is not limited to the forgoing example, and various methods of encoding position information corresponding to an ROI may also be used.

For example, the electronic device 200 may encode the position information of the ROI based on intensity information of light entering an image sensor through a lens. The light entering the image sensor through the lens may be slightly different depending on a relative position of the image sensor. The electronic device 200 may encode the position information of the ROI by considering such relative light intensity. Alternatively, the electronic device 200 may encode the position information of the ROI based on a Gaussian filter. The electronic device 200 may apply the Gaussian filter to encode the position information of the ROI in a form spreading from a center to an edge.

The electronic device 200 may obtain position information of the lens corresponding to an autofocus by inputting the third input data, along with the first input data and the second input data, to the ANN model. For example, in the case of first input data 610 being a dual-pixel image, one-channel second input data 620 is added to the two-channel first input data 610, and also third input data 630 to which a horizontal position corresponding to an x-axis direction of the ROI and a vertical position corresponding to a y-axis direction of the ROI are added as separate channels is added, and thus a total of a five-channel image may be input to the ANN model.

Alternatively, the electronic device 200 may obtain position information of a lens corresponding to an autofocus by inputting the first input data and the third input data to the ANN model. The electronic device 200 may obtain phase information of an image signal corresponding to an optical image formed by a current position of the lens through the image sensor. The phase information of the image signal may be the first input data. The electronic device 200 may encode the position information of the ROI in the image signal and perform autofocus based on the phase information and the encoded position information of the ROI. The encoded position information of the ROI may be the third input data.

The training devices, inference devices, electronic devices, processors, memories, camera modules, lens assemblies, flashes, image sensors, image stabilizers, ISPs, training device 100, inference device 150, electronic device 200, processor 201, memory 203, camera module 205, lens assembly 210, flash 220, image sensor 230, image stabilizer 240, memory 250, ISP 260, and other apparatuses, devices, units, modules, and components disclosed and described herein with respect to FIGS. 1-6 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:

generating first input data comprising phase information of an input image;

generating second input data in which lens position information is encoded such that a position of a lens is represented as a consecutive numerical value; and determining position information of the lens corresponding to autofocus by inputting the first input data and the second input data to a neural network model.

2. The method of claim 1, further comprising generating third input data in which position information corresponding to a region of interest (ROI) of the input image is encoded.

3. The method of claim 2, wherein the generating of the third input data further comprises encoding a relative position of the ROI in the first input data into first-axis data and second-axis data.

4. The method of claim 2, wherein the generating of the third input data further comprises encoding the position information of the ROI based on intensity information of light entering an image sensor through the lens.

5. The method of claim 2, wherein the generating of the third input data further comprises encoding the position information of the ROI based on a Gaussian filter.

6. The method of claim 2, wherein the determining of the position information of the lens comprises determining the position information of the lens by inputting the third input data to the neural network model along with the first input data and the second input data.

7. The method of claim 1, wherein the generating of the second input data further comprises encoding the lens position information based on a nonlinear function value adjusted to a focal length according to a position of the lens.

8. The method of claim 1, wherein the generating of the second input data further comprises encoding the lens position information in the form of a single channel.

9. The method of claim 1, wherein the generating of the second input data further comprises encoding the lens position information in the form of a scaling factor.

10. The method of claim 1, wherein the determining of the position information of the lens comprises predicting one position corresponding to the autofocus among a plurality of preset candidate positions.

11. The method of claim 1, wherein the determining of the position information of the lens comprises determining one scalar value corresponding to the autofocus.

12. The method of claim 1, wherein the first input data comprises a dual-pixel image.

13. A non-transitory computer-readable storage medium storing instructions that, when executed by one or more processors, configure the one or more processors to perform the method of claim 1.

14. An electronic device, the electronic device comprising:

one or more processors configured to:

generate first input data comprising phase information of an input image;

generate second input data in which lens position information is encoded such that a position of a lens is represented as a consecutive numerical value; and determine position information of the lens corresponding to autofocus by inputting the first input data and the second input data to a neural network model.

15. The electronic device of claim 14, wherein the one or more processors are configured to generate third input data in which position information corresponding to a region of interest (ROI) of the input image is encoded.

16. The electronic device of claim 15, wherein, for the generating of the third input data, the one or more processors are configured to encode a relative position of the ROI in the first input data into first-axis data and second-axis data.

17. The electronic device of claim 15, wherein, for the determining of the position information of the lens, the one or more processors are configured to generate the position information of the lens by inputting the third input data to the neural network model along with the first input data and the second input data.

18. The electronic device of claim 14, wherein, for the generating of the second input data, the one or more processors are configured to encode the lens position information based on a nonlinear function value adjusted to a focal length according to a position of the lens.

19. The electronic device of claim 14, wherein, for the determining of the position information of the lens, the one or more processors are configured to predict one position corresponding to the autofocus among a plurality of preset candidate positions.

20. The electronic device of claim 14, wherein, for the determining of the position information of the lens, the one or more processors are configured to generate one scalar value corresponding to the autofocus.

21. The electronic device of claim 14, wherein the first input data comprises a dual-pixel image.

22. A method of performing autofocus of an electronic device comprising an image sensor comprising pairs of first pixels and second pixels spaced apart from each other and a movable lens spaced apart from the image sensor, the method comprising:

obtaining a first image formed on the first pixels through a current position of the lens and a second image formed on the second pixels through the current position of the lens;

obtaining a region of interest (ROI) corresponding to a portion of the first image and the second image;

inputting a first image corresponding to the ROI, a second image corresponding to the ROI, the current position of the lens, and a position of the ROI to a neural network model;

receiving, as an output, a position of the lens in focus from the neural network model; and moving the lens to the position in focus, wherein the position of the lens is expressed as a continuous numerical value.

23. The method of claim 22, wherein all pixels of the image sensor are comprised in the pairs of the first pixels and the second pixels.

24. The method of claim 22, wherein only some pixels of the image sensor are comprised in the pairs of the first pixels and the second pixels.

25. The method of claim 22, wherein the ROI is a region inputted from a user.

26. The method of claim 22, wherein the ROI is a region corresponding to a specific object.

27. The method of claim 26, wherein the specific object is a human face.

28. The method of claim 22, wherein the ROI is a preset region in the first image and the second image.

29. The method of claim 28, wherein the ROI is a central region in the first image and the second image.

30. The method of claim 22, wherein x-axis data and y-axis data of the ROI are individually input to the neural network model.

31. The method of claim 22, wherein the current position of the lens is input to the neural network model as a single channel.

32. The method of claim 22, wherein the current position of the lens is applied to the neural network model as a scalar value.

33. The method of claim 22, wherein the position of the lens in focus is output as one of 100 or more consecutive positions within a movable range of the lens.

34. The method of claim 22, wherein the position of the lens in focus is output as one of 1000 or more consecutive positions within a movable range of the lens.

* * * * *